Dec. 20, 1960  H. M. McCONNELL  2,965,740
METHOD FOR WELDING PLATE EDGES
Original Filed Aug. 17, 1956  4 Sheets-Sheet 1
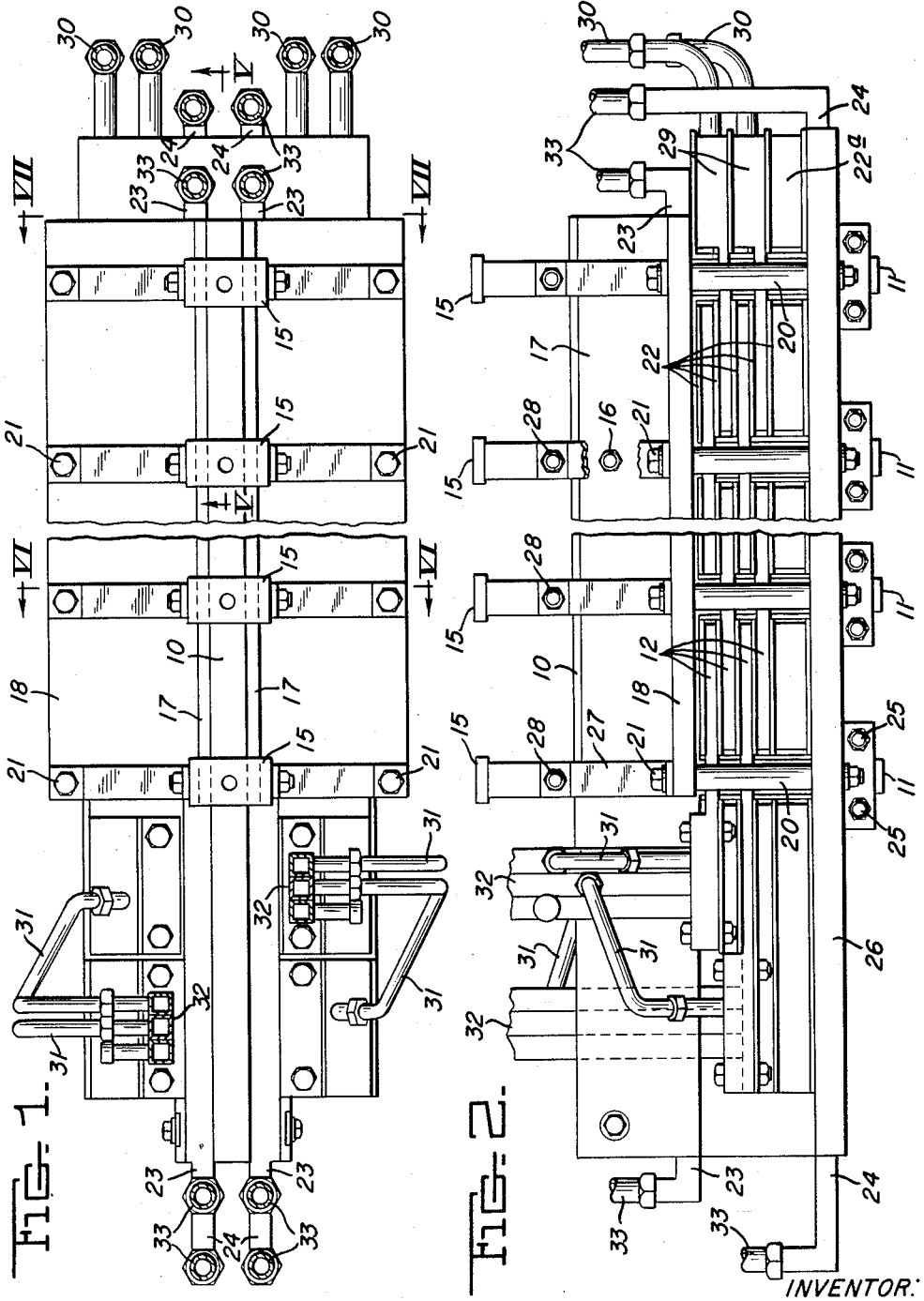
INVENTOR:
HOWARD M. McCONNELL,
BY: Donald G. Dalton
his Attorney.

Dec. 20, 1960 H. M. McCONNELL 2,965,740
METHOD FOR WELDING PLATE EDGES
Original Filed Aug. 17, 1956 4 Sheets-Sheet 2
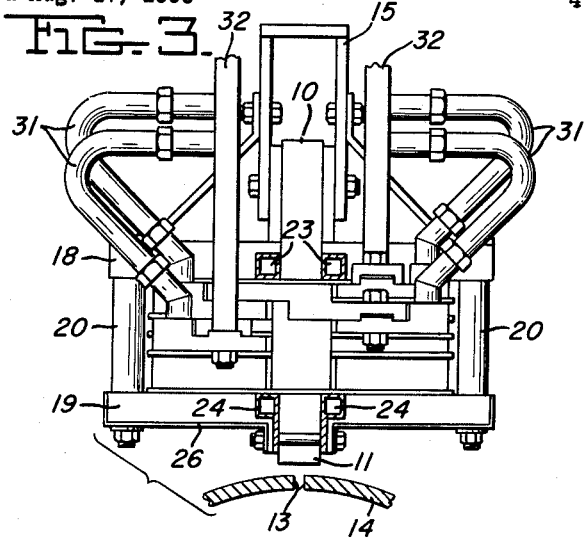
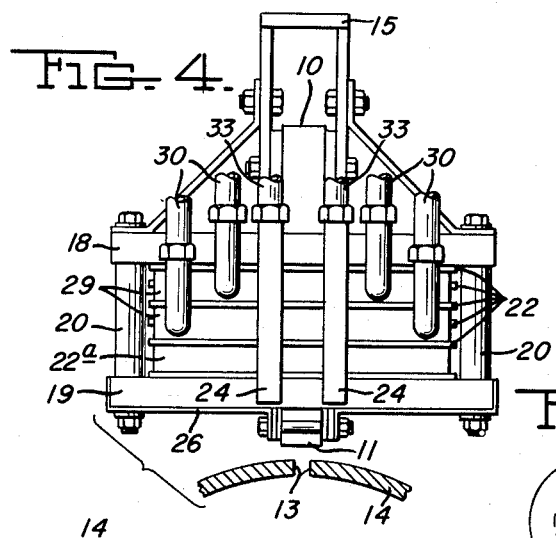
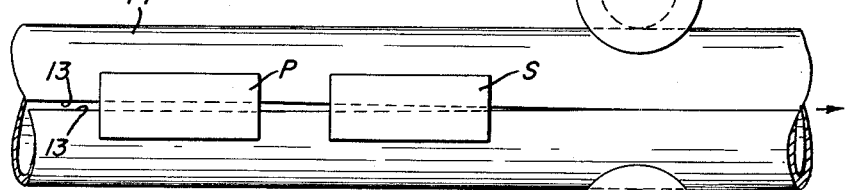
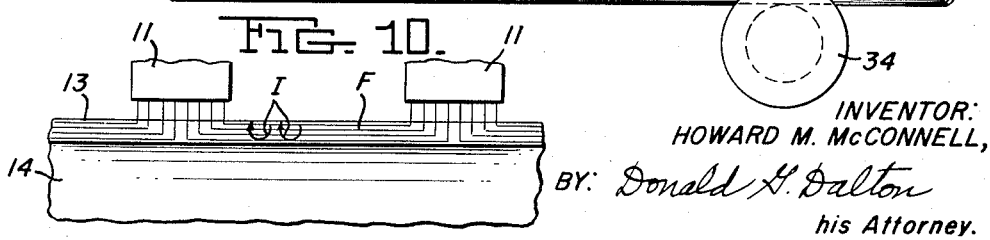
INVENTOR:
HOWARD M. McCONNELL,
BY: Donald G. Dalton
his Attorney.

Dec. 20, 1960 H. M. McCONNELL 2,965,740
METHOD FOR WELDING PLATE EDGES
Original Filed Aug. 17, 1956 4 Sheets-Sheet 3
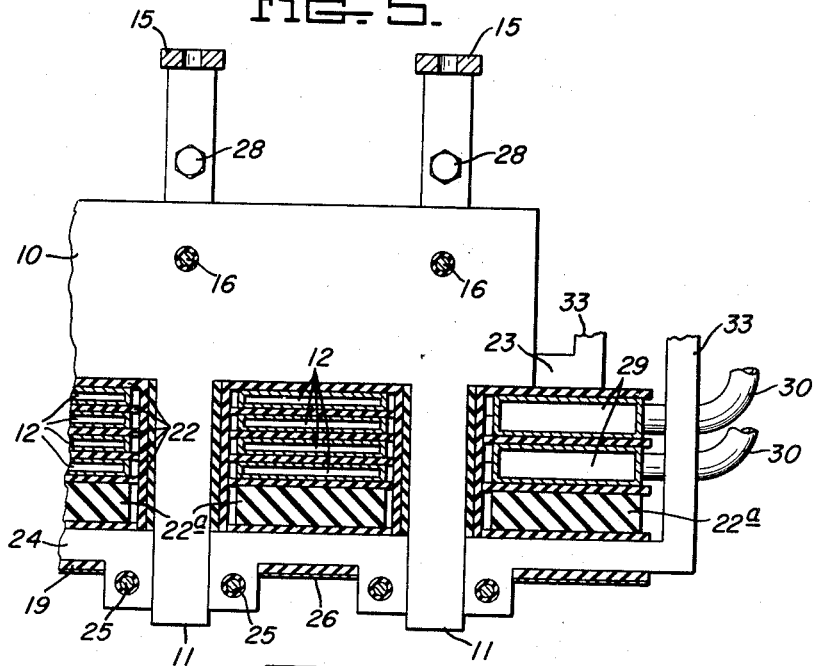
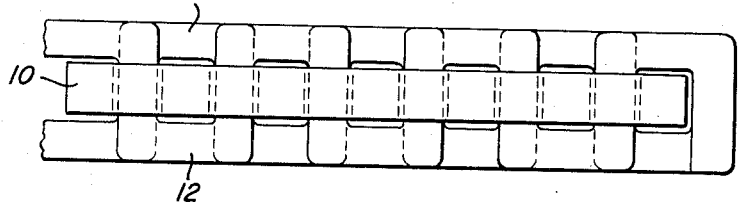
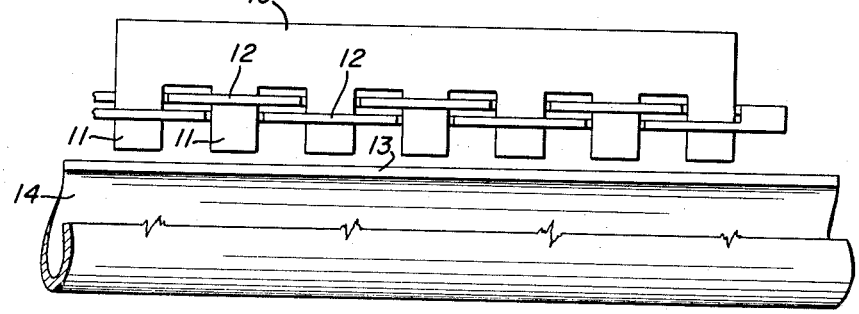
INVENTOR:
HOWARD M. McCONNELL,
BY: Donald G. Dalton
his Attorney.

INVENTOR:
HOWARD M. McCONNELL,
BY: Donald G. Dalton
his Attorney.

United States Patent Office 2,965,740
Patented Dec. 20, 1960

2,965,740

METHOD FOR WELDING PLATE EDGES

Howard M. McConnell, Chagrin Falls, Ohio, assignor to United States Steel Corporation, a corporation of New Jersey Original application Aug. 17, 1956, Ser. No. 604,654, now Patent No. 2,879,365, dated Mar. 24, 1959. Divided and this application Apr. 10, 1958, Ser. No. 727,565

2 Claims. (Cl. 219—8.5)

This invention relates to the progressive welding of the edges of steel plate, such as those of a formed pipe blank, and in particular, to a method for heating traveling plate edges by inducing local eddy currents therein, preparatory to welding.

This is a division from my copending application Serial No. 604,654, filed August 17, 1956, now Patent No. 2,879,365.

Induction heating has proved successful for the welding of thin sections. When it is attempted to apply a similar practice to the welding of plate edges of thicknesses such as ⅜", however, there is insufficient penetration of the heating to permit a sound weld through the entire thickness of the metal because, at the frequencies employed, the heating effect is confined largely to the surface layer of the plate.

I have invented a novel method particularly adapted for preheating ferrous plate edges such as those of a pipe blank of steel, having a thickness of the order of ⅜", at a satisfactory speed of travel, e.g., 10–12 f.p.m. My method takes advantage of the magnetic property of the work and is thus fully effective only at temperatures below the Curie point. For heating to the final welding temperature, devices such as that of Sorenson Patent No. 2,652,474 may be installed for cooperation with the work in immediate succession to my preheating inductor. Such devices operate by straight transformer action, utilizing the work as the secondary winding. Thus the method of my invention contemplates generally a two-stage heating of the work to welding temperature, viz., an initial or preheating stage utilizing local eddy currents in the plate edges disposed adjacent but spaced from each other, and a final stage of heating to welding temperature by transformer action as the plate edges are brought into direct contact. The flux induced in the work by the preheating inductor flows along the edges to be welded, in contrast to the across-the-gap flux induced by the Sorenson inductor.

A complete understanding of the invention may be obtained from the following detailed description and explanation which refer to the accompanying drawings illustrating the present preferred embodiment. In the drawings:

Figure 1 is a plan view of my preheating inductor;

Figure 2 is an elevation thereof, partly broken away;

Figures 3 and 4 are end views looking from the left and right respectively;

Figure 5 is a partial longitudinal section taken along the plane of line V—V of Figure 1;

Figures 8 and 9 are diagrammatic plan and elevation views showing the arrangement of the electrical winding;

Figure 10 is a diagram showing the paths of the flux and induced current; and

Figure 11 is a diagrammatic plan view showing the location of the preheating inductor relative to the inductor which serves to bring the plate edges to welding heat.

Referring now in detail to the drawings and, for the present, particularly to Figures 8, 9 and 10, and elongated, laminated magnetic core 10 has salient poles 11 spaced therealong. Windings 12 are intertwined zig-zag fashion about the poles so that adjacent poles have opposite polarity at any instant. Thus, when the windings are energized, flux flows as indicated at F along the adjacent but spaced-apart edges 13 of the seam cleft in a formed pipe blank 14, positioned below and aligned with core 10. If the windings are energized by alternating current of suitable frequency, i.e., 1500 to 4000 cycles per second, local eddy currents indicated at I will be induced in the edges 13. These currents circulate in paths surrounding the band of flux F. By advancing the pipe blank axially along the length of core 10, a uniform heating effect will be produced in the blank edges.

Figure 6:
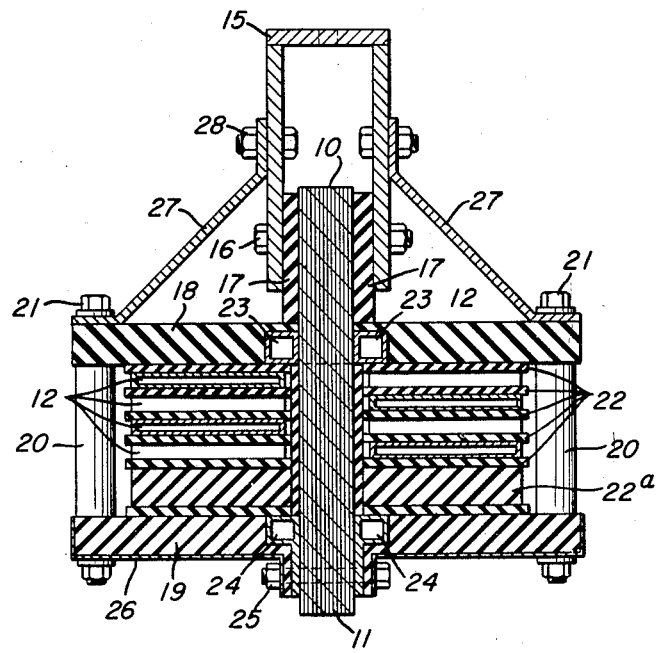
Figures 6 and 7 are transverse sections taken along the planes of lines VI—VI and VII—VII, respectively, of Figure 1.
Figure 7:
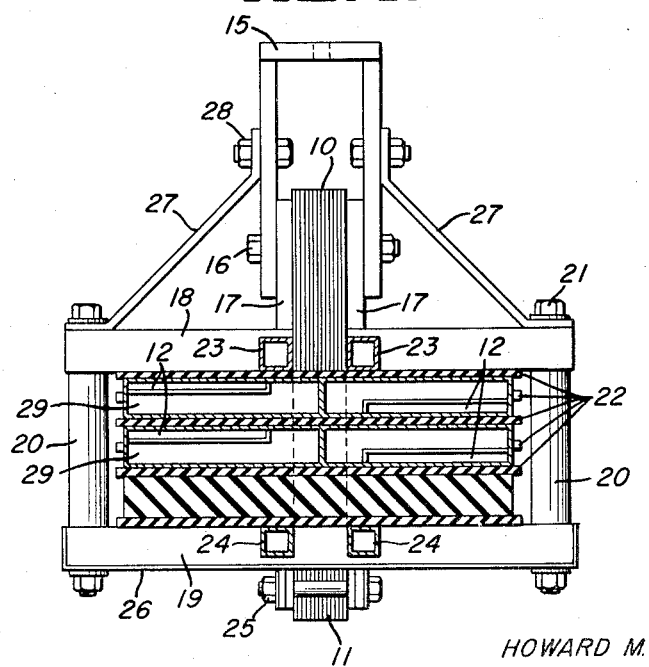

Figures 1–7 show the details of an inductor embodying the principle explained above with reference to Figures 8–10. Core 10 is suspended from overhead on any available support by a plurality of hanger brackets 15 attached thereto by bolts 16 with insulating spacer plates 17 disposed between the core and brackets. Windings 12 are confined between upper and lower insulating plates 18 and 19. These plates are held in spaced relation by posts 20 and through bolts 21. Insulating spacers 22 and 22a are inserted between the turns of the windings and between the windings and plates 18 and 19. Plates 18 and 19 are slotted to accommodate core 10 and poles 11 and are recessed along their inner edges to accommodate cooling pipes 23 and 24 in contact with the core. Plate 19 and pipes 24 have flanges depending along the sides of poles 11 connected by bolts 25. A thermal reflector sheet 26 of non-magnetic stainless steel polished to a state of good reflectivity, overlies the bottom surface of plate 19. Braces 27 extend from brackets 15 to the upper plate 18, being secured to the former by bolts 28 and to the latter by bolts 21.

The inductor shown in Figures 1–7 includes two complete windings 12. These windings are formed from flat copper tube having a width several times its thickness, as clearly shown in Figure 7. At the right-hand end of the inductor, the windings communicate with terminal boxes or coolant-inlet chamber 29 (see Figures 5 and 7). Each chamber has a central partition extending longitudinally of the inductor. Coolant-supply pipes 30 are connected to the chambers and extend to any convenient source of cooling water. At the other end of the inductor, tubular conductors 31 extend from the ends of the windings 12 to tubular busbars 32 which connect the windings to a suitable source of current. Conductors 31 serve as electrical connections as well as coolant pipes. Coolant-supply connections 33 extend outwardly and upwardly from pipes 23 and 24 at both ends of the inductor.

Figure 11 shows the relative positions of my preheating inductor designated P, and a welding inductor such as shown in Sorenson Patent No. 2,652,474, indicated at S. As there illustrated, the edges 13 of pipe blank 14 are spaced apart under inductor P and approach each other under inductor S. They are finally brought together under pressure by welding rolls 34 as the blank travels in the direction indicated by the arrow. Inductor P is effective to heat the blank edges throughout their thickness up to from 1300 to 1500° F. at a good speed of travel, while inductor S further raises the temperature of the edges to the welding point.

In a specific embodiment of my preheating inductor designed for a frequency of 3000 c.p.s., the over-all length of the structure is about 2 feet, with seven poles ⅞" square, spaced on 4" centers. The two windings (each making one full turn about each pole) connected in series are designed for a current of 2250 amperes, the total input being about 200 k.v.a. at a power factor of about 68%.

The invention has important advantages over known welding inductors. In the first place, good penetration of heating may be obtained through plate thicknesses of ⅜" or even ½". Since the flux flows along the edges to be joined, saturation is obtained more easily, with deeper penetration of heating, than by flux flowing across the gap between the edges. The windings are adapted to carry the heavy current required to produce the necessary ampere-turns, even though each pole has only two turns. The windings are fully insulated from each other and the core, and adequate cooling is provided for both. Satisfactory welding of plate edges having a thickness in the range stated, may be effected at a speed of 12 f.p.m. by using a conventional inductor between my inductor and the welding rolls. The structure of my inductor is simple and sturdy and it may be readily mounted in a processing line adapted to handle pipe blanks of large size continuously. The thermally reflecting bottom sheet protects the inductor from heat radiated by the work.

Although I have disclosed herein the preferred practice of my invention, I intend to cover as well any change or modification therein which may be made without departing from the spirit and scope of the invention.

I claim:

1. A method of welding the initially spaced edges of a seam cleft in a formed pipe blank comprising moving the blank axially while effecting gradual closure of said cleft, inducing magnetic flux in said edges generally parallel thereto and in opposite directions in adjacent increments of the length thereof where the edges remain spaced apart providing magnetic return paths for the flux in said increments outside the blank, thereby preheating said edges to a temperature between 1300 and 1500° F., inducing magnetic flux across the cleft in an immediately preceding portion of the length where the edges are closer together, thereby raising their temperature to the welding point, and finally abutting the edges under welding pressure.

2. A method of heating spaced plate edges preparatory to welding which consists in moving said edges longitudinally, progressively inducing in succeeding portions of narrow marginal bands along said edges only, magnetic fluxes generally parallel thereto and alternately in opposite directions, and providing magnetic return paths for said fluxes outside of said edges, thereby inducing eddy currents confined to said bands in planes normal to said edges.

References Cited in the file of this patent

UNITED STATES PATENTS

| | | |
|---|---|---|
| 1,365,199 | Sessions | Jan. 11, 1921 |
| 2,647,982 | Baker | Aug. 4, 1953 |
| 2,673,274 | Vaughan et al. | Mar. 23, 1954 |
| 2,692,322 | Bennett | Oct. 19, 1954 |
| 2,852,649 | Limpel | Sept. 16, 1958 |

FOREIGN PATENTS

| | | |
|---|---|---|
| 716,378 | Great Britain | Oct. 6, 1954 |